United States Patent [19]

Burzynski et al.

[11] Patent Number: 4,551,361

[45] Date of Patent: Nov. 5, 1985

[54] TINTABLE SCRATCH RESISTANT COATING

[75] Inventors: Alfred J. Burzynski; James J. Tillman, both of Toledo, Ohio

[73] Assignee: Owens-Illinois, Inc., Toledo, Ohio

[21] Appl. No.: 671,535

[22] Filed: Nov. 15, 1984

[51] Int. Cl.$^4$ .................................................. B32B 3/00
[52] U.S. Cl. ............................... 427/164; 106/287.14; 106/287.16; 427/169; 427/387; 428/412; 428/447; 351/162; 350/165
[58] Field of Search ....................... 524/765, 858, 866; 427/164, 169, 387; 428/412, 447; 528/23; 106/287.14, 287.16; 351/162, 166; 350/165

[56] References Cited

U.S. PATENT DOCUMENTS

| | | | |
|---|---|---|---|
| 3,654,058 | 4/1972 | Jasinski et al. | 528/23 |
| 3,953,115 | 4/1976 | French et al. | 427/164 |
| 4,355,135 | 10/1982 | January | 528/23 |
| 4,395,461 | 7/1983 | Ching | 524/858 |

*Primary Examiner*—Lewis T. Jacobs
*Attorney, Agent, or Firm*—John R. Nelson

[57] ABSTRACT

A tintable coating is applied to a transparent substrate such as a polycarbonate lens. The coating is made from a coating solution of (1) a further curable organopolysiloxane preferably made by hydrolyzing methacryloxytrimethoxy silane and vinyl triethoxy silane with phenylphosphonic acid, and an (2) organic solvent for the organopolysiloxane. The coating is cured, and azo dye applied to the cured coating, and the coating heated to provide a highly tinted coating without sacrificing scratch resistance.

18 Claims, No Drawings

TINTABLE SCRATCH RESISTANT COATING

The present invention relates to a hard, tintable, scratch resistant organopolysiloxane coating for a transparent substrate such as a polycarbonate lens.

BACKGROUND OF THE INVENTION

In the prior art, the commercially used tintable coatings for polycarbonate lens and the like provide only a 10-20% absorbency pick-up (single side) and the time required is at least 45 minutes.

Hence there is a need for a hard tintable scratch resistant coating for a transparent substrate such as a polycarbonate lens. The desired coating would have more dye pick-up than the present systems in less time without sacrifice of reasonable hardness and good scratch resistance.

OBJECTS OF THE INVENTION

It is an object of the present invention to provide an organopolysiloxane coating for a transparent base such as a polycarbonate lens, the coating being more easily and effectively applied, being applied in less time and resulting in a harder, more scratch resistant with a high degree of tintability.

It is an object of the present invention to provide an organopolysiloxane coating for a transparent base such as a polycarbonate lens in which the coating is hard, scratch resistant and highly tinted, the coating composition tinting to 70 to 80% absorbency in a short time of about 10 to 20 minutes.

It is an object of the present invention to provide an organopolysiloxane coating for a transparent base such as a polycarbonate lens in which the organopolysiloxane can be easily prepared on a commercial basis, the coating composition easily made up and used, the cured coating being effectively tinted with either water or solvent soluble azo dyes normally used to tint fibers, the tinting rate being fast (10-20 minutes) and the degree of tintability being very high (up to 80% absorbency—single side) without sacrificing hardness or scratch resistance or abrasion resistance.

THE INVENTION

The present invention provides a composition for providing a scratch resistant, tintable coating for a transparent substrate, the composition comprising: (A) a further curable, solvent soluble organopolysiloxane that is a hydrolysis reaction product of methacryloxypropyltrimethoxy silane and water; (B) phenylphosphonic acid as an additive before coating the curable substrate or used in the hydrolysis as a starting ingredient; (C) an organic azo dye for tinting the cured composition; (D) an organic solvent for (A) and (B), the solution being adapted for curing and the coating subsequently receiving an application of the azo dye to form a scratch resistant tinted coating upon heating at about 240° to 270° F.

The present invention also provides a method of producing a scratch resistant tinted coating on a transparent substrate without reducing the tinting (measured by % absorbency) at the expense of greater adhesion and scratch resistance, the method comprising the steps of (A) hydrolyzing methacryloxypropyltrimethoxy silane (MPMTS) and vinyl triethoxy silane (VTS) with about 1 to 7 moles of water and phenylphosphonic acid (PPA) to provide a solvent soluble, further curable organopolysiloxane; (B) dissolving the organopolysiloxane of step (A) in an organic solvent; (C) adding PPA to the solution of (B) and dissolving the same; (D) coating a transparent substrate with the solution of (C); (E) heating the coating to cure the organopolysiloxane; (F) applying an azo dye to tint the material to provide a tinted scratch resistant coating.

The hydrolysis and concentration steps of preparing the low molecular weight (about 1000 or 1500 up to about 2000 to 3000) organopolysiloxane are well known and commercially feasible, such steps being shown for trialkoxy silanes in U.S. Pat. No. 3,389,114, for an invention of Burzynski and Martin.

As is noted in the present invention the silane has organofunctional groups (methacrylo- and vinyl) for providing the improved tintability, adhesion and scratch resistance for the coatings on polycarbonate and the like.

PPA is used generally in amounts of about ½ to 1 up to 6 or 7 wt. % based on the silane monomer, the PPA apparently assisting the hydrolysis and polymerization reactions. PPA is preferably used in amounts of about 2 to 5% and most preferably about 2½ to 4%. Generally, at least about 40 to 60 wt. % and preferably about 50% of the total PPA is used in the hydrolysis. In the event VTS is used, PPA need only be used in the hydrolysis and is often used in only half the amount normally used.

The azo dye is generally a mixture of azo dyes normally used to tint textiles and fibers, such azo dyes including mono-, di- and tri-azo dyes such as set forth in Kirk-Othmer, Vol. 3, pages 387-399. Useful specific dyes are set forth in the Kirk-Othmer including Congo Red:

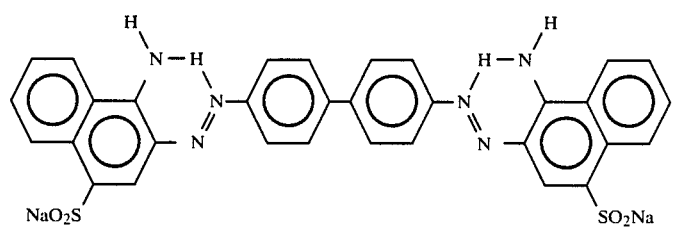

Orange 11:

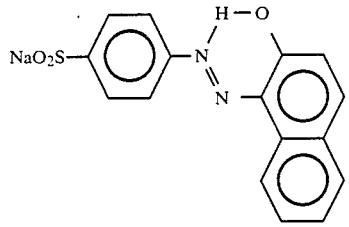

and Chrysoidine Y

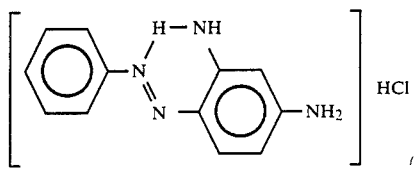

Suitable azo dye mixtures include those with Acid Yellow 23, Acid Red 1 and Diamond Black PV.

As previously indicated the azo dyes and organosiloxane polymers make the coating highly tintable and the dyes are picked-up 65 or 70% up to as high as about 75 to 80% absorbency in only 10 to 20 minutes and preferably only 12 to 15 minutes. Although not wishing to be bound by theory, the azo dyes and organopolysiloxane coating in the coating composition apparently coact to bring out the rich tinting effect, the good adhesion, and the fast rate of tinting.

The abrasion resistance tests are performed with 000 steel wool and the adhesion tests are performed with a groove and scotch tape. The abrasion resistance and adhesion were excellent for the coatings of the invention especially when about 40 to 60 parts by weight of VTS is used per 100 parts by weight of total silane monomer.

As indicated, the azo dyes are preferably a mixture of azo dyes such as a mixture of mono- and di-azo dyes or a mixture of mono- and tri-azo or a mixture of di- and tri-azo dyes. The mixture can be a mixture of just monoazo dyes or a mixture of tri-azo dyes, etc. A suitable dye is BPI Molecular Catalytic Dye, a mixture of dyes sold by Brain Power Incorporated, Miami, Fla.

In general, the azo dyes are dyes normally used as textile dyes and are made by Kodak and BASF-Wyandot. The hard transparent substrate is preferably an aliphatic or aromatic polycarbonate such as a CR39 polycarbonate lens (P.P.G. or Lexan ™, General Electric), although glass and polyacrylics are suitable as long as adhesion is obtained. Translucent substrates for some applications can be used including decorative color applications such as metals with decorations.

The following examples are intended to illustrate rather than limit the present invention.

EXAMPLE 1

A hard, tintable scratch resistant coating was prepared by making a tintable resin for coating a polycarbonate lens by reacting 1 mole of (248.1 g) methacryloxypropyltrimethoxy silane (MPTMS) with 2.3 moles (41.4 g) water and $2\frac{1}{2}$% by wt. of phenylphosphonic acid (PPA) based on the weight of the silane monomer to hydrolyze the silane. The ingredients are added to a flask. The solution is cleared immediately with a slight exotherm (or the reaction can be started in two phases). The flask (a 3-neck 500 ml flask) is equipped with a stir bar, a heating mantle, a thermometer, and a take-off condenser. After clearing and reaching reflux temperature (72° to 74° C.), the reaction mixture is refluxed for 4 hours. After the reflux period, some alcohol and water by-products are removed by distillation. A total of 60 ml is collected in this reaction.

Heating is stopped and the reaction mixture allowed to cool to room temperature. Tests for % by weight solids are run to make sure to provde a solids content of 72 to 78 wt. % depending upon the quantity of alcohol removed. The partially hydrolyzed further curable, solvent soluble organopolysiloxane resin is then diluted to the desired coating concentration, (40% by wt. solids) with N-butanol as the solvent.

EXAMPLE 2

The coating solution of Example 1 and an additional $2\frac{1}{2}$% by weight of phenylphosphonic acid (PPA) to make a total of 5% by weight of the resin solids content are mixed until the PPA is dissolved, with external heating used to aid the dissolving of the PPA. The solution is filtered through a 0.2 micron filter to remove all foreign materials such as dust and gels.

An acrylic base primer was used to prime coat a transparent polycarbonate lens.

The resultant above described filtered coating solution is applied by dipping (or by flow coating or spraying) to the prime coated hard transparent polycarbonate lens. After air drying the wet coating, the coating and lens are placed in an oven at 250° to 265° F. and heated for $2\frac{1}{2}$ hours.

The resultant cured organopolysiloxane coating is securely attached to the lens and is dipped and immersed in a bath of a mixture of azo dyes (textile dyes—also used for lens coating) to provide a tinted, hard scratch resistant coating on the lens. The coating (single side) tints to 80+% absorbency in only 10 to 20 minutes. The prior art technique used for tintable coatings allows generally only a 10-20% (sometimes 30%) absorbency (single side) pick-up of the azo dye mixture and this pick-up requires at least 30 to 45 minutes.

EXAMPLE 3

A curable tintable resin was prepared using 50 parts by weight of MPTMS and 50 parts by weight of vinyl triethoxy silane (VTS) as the silane starting material to provide a copolymeric organopolysiloxane in which the main polymer chains contain residue of both the MPTMS and the VTS.

VTS (0.5 moles) 95 g (available from Union Carbide as A-151 ™ silane material) and MPTMS (0.5 moles) 124 g (available from Union Carbide as A-174 ™ silane material) were hydrolyzed with water (2.3 moles) 41.4 g and 5.5 g PPA (2½% by wt. based on the silane monomers) as described in Example 1. The resultant further curable resin was coated on a polycarbonate substrate as described in the previous Example. The tinting, abrasion resistance and adhesion were excellent.

A number of examples were prepared as described in Examples 1, 2 and 3 to provide hard cured tinted coatings on a polycarbonate substrate. The examples are set forth in Tables 1 and 2 that follow, the first adhesion value being before tinting and the second adhesion value being after tinting and TMAH meaning tetramethylammonium hydroxide.

TABLE 1

| Example No. | Moles VTES | Moles A-174 (MPMTS) | PPA % | H₂O Ratio | W/O Additional PPA AR | Tint | Adhesion | Cure | W/Additional PPA AR | Tint | Adhesion |
|---|---|---|---|---|---|---|---|---|---|---|---|
| 1 | 1 | — | 1.0 | 2.3 | poor | 10 (1) | 0 | 1 hr. at 250° F. | — | — | — |
| 2 | 1 | — | 1.0 | 2.3 | — | — | — | 1 hr. at 250° F. | poor | 10 (1) | 10 (8) |
| 3 | 1 | — | 1.0 | 2.3 | poor | 10 (1) | 0 | 2 hrs. at 250° F. | — | — | — |
| 4 | 1 | — | 1.0 | 2.3 | — | — | — | 2 hrs. at 250° F. | fair | 10 (1) | 10 (8) |
| 5 | 1 | 1 | 2½ | 2.3 | good+ | 10 | 10 (10) | 2½ hrs. at 250° F. | — | — | — |
| 6 | 1 | 1 | 2½ | 2.3 | — | — | — | 2½ hrs. at 250° F. | good+ | 10 | 10 (8) |
| 7 | 1 | 3 | 2½ | 2.3 | good–good+ | 10 | 10 (10) | 2½ hrs. at 250° F. | — | — | — |
| 8 | 2 | 1 | 2½ | 2.3 | good–good+ | 10 | 10 (10) | 2½ hrs. at 250° F. | — | — | — |
| 9 | 2 | 1 | 2½ | 2.3 | — | — | — | 2½ hrs. at 250° F. | good+ | 10 | 10 (10) |
| 10 | 1 | 1 | 2½ | 2.3 | good | 10 | 10 | 2½ hrs. at 250° F. | — | — | — |
| 11 | 1 | 2 | 2½ | 2.3 | good | 10 | 10 (10) | 2½ hrs. at 250° F. | — | — | — |
| 12 | 1 | 2 | 2½ | 2.5 | good | 10 | 10 (10) | 2½ hrs. at 250° F. | — | — | — |
| 13 | 1 | 1 | 2½ | 2.5 | good | 10# | 10 (10) | 2½ hrs. at 250° F. | — | — | — |
| 14 | 1 | 2 | 5.0 | 2.3 | good | 10 | 10 (10) | 2½ hrs. at 250° F. | — | — | — |
| 15 | 1 | 1 | 5.0 | 2.3 | good–good+ | 10 | 10 (10) | 2½ hrs. at 250° F. | — | — | — |
| 16 | 1 | 2 | 5.0 | 2.5 | fair–good | 10 | 10 (8) | 2½ hrs. at 250° F. | — | — | — |
| 17 | 1 | 1 | 5.0 | 2.5 | good–good+ | 10 | 10 (0) | 2½ hrs. at 250° F. | — | — | — |
| 18 | 1 | 1 | 2½ | 2.0 | good | 10 | 10 (10) | 2½ hrs. at 250° F. | — | — | — |
| 19 | 1 | 2 | 2½ | 2.0 | good | 10 | 10 (9) | 2½ hrs. at 250° F. | — | — | — |
| 20 | 1 | 1 | 20 ppm H+ (No PPA) | 2.3 | poor | 5 poor streaky | 10 (10) | 2½ hrs. at 250° F. | +5% PPA good | 10 some red | 10 (10) |
| 21 | 1 | 2 | 20 ppm H+ (No PPA) | 2.3 | fair | poor | 10 (10) | 2½ hrs. at 250° F. | +5% PPa good–good+ | 10 some red | 10 (10) |
| 22 | 1 | — | 2½ | 2.0 | poor | 10 spotty | 10 (10) | 2½ hrs. at 250° F. | +5% PPa poor | 10 purple & spotty, blisters | 10 (10) |
| 23 | 1 | 1 | 1.0 | 2.3 | good | 10 | 10 (10) | 2½ hrs. at 250° F. | good | 10 | 10 (10) |
| 24 | 1 | 2 | 1.0 | 2.3 | poor–fair | 10 | 10 (10) | 2½ hrs. at 250° F. | fair–good | 10 | 10 (10) |
| 25 | 1 | — | 2½ | 2.3 | poor | 10 blue-purple | 10 (10) | 2° hrs. at 250½ F. | poor | 10 purple | 10 (10) |
| 26 | 1 | 1 | 2½ | 3.0 | good–good+ | 10 blue-gray | 10 (10) | 2½ hrs. at 250° F. | good–good+ | 10 | 10 (10) |
| 27 | 1 | 2 | 2½ | 3.0:1 | fair | 10 | 10 (10) | 2½ hrs. at 250° F. | fair | 10 | 0 |
| 28 | 1.5 | 1 | 2½ | 2.3:1 | good | 10 | 10 (10) | 2½ hrs. at 250° F. | good | 10 | 10 (0) |
| 29 | 2 | 1 | 2½ | 2.3:1 | good–good+ | 10 | 10 (9) | 2½ hrs. at 250° F. | good | 10 | 10 (0) |
| 30 | 1.25 | 1 | 2½ | 2.3:1 | good–good+ | 10 | 10 (10) | 2½ hrs. at 250° F. | fair–good | 10 | 10 (0) |

TABLE 1-continued

| Example No. | Moles VTES | Moles A-174 (MPMTS) | PPA % | H₂O Ratio | W/O Additional PPA | | | | W/Additional PPA | | |
|---|---|---|---|---|---|---|---|---|---|---|---|
| | | | | | AR | Tint | Adhesion | Cure | AR | Tint | Adhesion |
| 31 | 1.5 M-MTS-32 | — | 2½ | 1.4:1 | — | — | — | — | — | — | — |
| 32 | 1 | 2 | 500 ppm H+ (No PPA) | 2.3:1 | fair-good | Blue Streaks 5 orange peel | 10 (0) | 2½ hrs. at 250° F. | good | 10 | 10 (10) |
| 33 | — | 1 | 2½ | 2.3:1 | good | 10 | 10 (0) | 2½ hrs. at 250° F. | good | 10 | 10 (0) |
| 34 | 1 | 1 | 2½ | 2.3:1 | good | 10 | 10 (10) | 2½ hrs. at 250° F. | good | 10 | 10 (0) |
| 35 | 1.5 M-MTS-32 | — | 2½ | 1.25:1 | poor | 10 | 10 (0) | 2½ hrs. at 250° F. | poor | 10 | 0 |

TABLE 2

Comments for each of the examples of Table 1 are shown below in Table 2.

| Example No. | Comment |
|---|---|
| 1 | Tints very well - more blue than gray - no red - excellent color. |
| 2 | ⁸ Adhesion after tinting drops to 8. |
| 3 | — |
| 4 | — |
| 5 | No red - good blue-gray. |
| 6 | Some red - still fairly good - looses adhesion with extra PPA - both coating appearances good. |
| 7 | 25% primer instead of 50% - 3 & 4 hours no improvement. |
| 8 | 50% primer - conc soln as prepared - gelled 9/6/84 |
| 9 | Color very good for both - had some red with additional 5% PPA. |
| 10 | 25% primer instead of 50%; 3 & 4 hr cure no improvement - (blue-gray - no red) |
| 11 | 25% primer instead of 50%; 3 & 4 hr cure - no improvement (blue-gray - no red) |
| 12 | 25% primer instead of 50%; gave darker color. |
| 13 | Not as dark as 12. |
| 14 | Very faint hint of red - lower portion. |
| 15 | Very good color - slight hint of red on lower portion. |
| 16 | Very good color - faint red color throughout coating. |
| 17 | Faint tint of red throughout lense - blue-gray |
| 18 | Deep blue rather than blue-gray - no red - better dye uptake |
| 19 | Deep blue rather than blue-gray - better dye uptake |
| 20 | Also 2½% PPA - AR - fair; tint 10 - blue-gray; adhesion 10(10) |
| 21 | Also 2½% PPA - AR - good; tint 10 blue-gray; 10(10) |
| 22 | Also 1½% TMAH - AR poor; tint 10 roughly 50% light blue; adhesion 10(10) |
| 23 | Some red color at 5% PPA |
| 24 | Some red color at 5% PPA |
| 25 | Tint bluish purple w/o additional PPA; Purple with additional 5% PPA |
| 26 | Additional 5% PPA tint has slight red. |
| 27 | Additional 5% PPA - tint has a little red to it. |
| 28 | Loss adhesion after tinting (5% PPA) |
| 29 | Loss adhesion after tinting (5% PPA) |
| 30 | Loss adhesion after tinting; some red color. |
| 31 | Undiluted sample gels on standing. |
| 32 | Additional 5% PPA - tint has red to it. |

TABLE 2-continued

Comments for each of the examples of Table 1 are shown below in Table 2.

| Example No. | Comment |
|---|---|
| 33 | PPA dissolved in H₂O and added to A-174 - 5% PPA; some red color. |
| 34 | PPA dissolved in H₂O and added to A-174 - 5% PPA; some red color. |
| 35 | Both as received + 5% PPA - tint light purple approximately 50% tintability |

In the tables, an adhesion of 10 is very good. A tint of 10 is very good, representing high absorbency.

What is claimed is:

1. A composition for providing a scratch resistant, tintable cured coating for a substrate, the composition comprising
    (A) a further curable, solvent soluble organopolysiloxane that is a hydrolysis reaction product of methacryloxypropyltrimethoxy silane and water;
    (B) phenylphosphonic acid as an additive to part (A) before coating the substrate or used in the hydrolysis as a starting ingredient; and
    (C) an organic solvent for (A) and (B), the solution being adapted for coating and curing to form a scratch resistant azo dye tintable cured coating.

2. A composition as defined in claim 1 in which the amount of water used is about 1.5 moles to 7 moles per mole of silane.

3. A composition as defined in claim 1 in which the amount of phenylphosphonic acid used is about 1 to 4 parts by weight per 100 parts of silane starting material.

4. A composition as defined in claim 1 in which about 25 to 75 parts by weight of vinyltriethoxysilane per 100 parts total silane is used with the methacryloxypropyltrimethoxy silane.

5. A composition as defined in claim 1 in which the silane starting material is about 50 parts by weight of vinyltriethoxysilane and 50 parts by weight of methacryloxypropyltrimethoxy silane.

6. A composition as defined in claim 1 in which about 2.3 moles of water is used per mol of silane.

7. A composition as defined in claim 1 in which the organic solvent is N-butanol.

8. A composition as defined in claim 1 in which the azo dye is a mixture of azo dyes including Congo Red

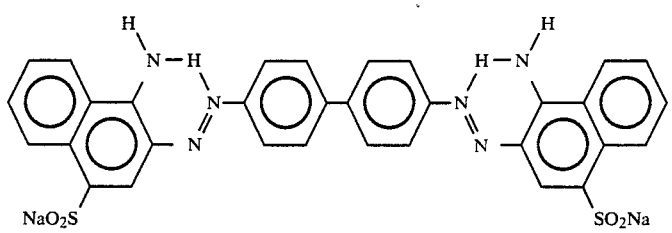

9. A composition as directed in claim 1 in which the azo dye is a mixture of azo dyes including Orange 11

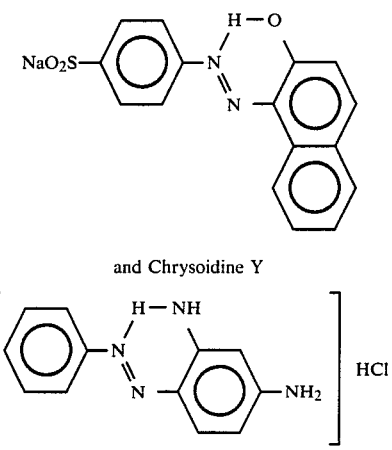

and Chrysoidine Y

10. A method of producing a scratch resistant, cured, tintable coating on a transparent substrate without reducing the tinting absorbency at the expense of greater adhesion and scratch resistance, the method comprising the steps of:
(A) hydrolyzing methacryloxypropyltrimethoxy silane and vinyl triethoxy silane with 1 to 7 moles of water and phenylphosphonic acid to provide a solvent soluble, further curable organopolysiloxane;
(B) dissolving the organopolysiloxane of step (A) in an organic solvent;
(C) adding phenylphosphonic acid to the solution of (B) and dissolving the same;
(D) coating a transparent substrate with the solution of (C);
(E) heating the coating to cure the organopolysiloxane and provide a tintable, cured, scratch resistant coating.

11. A method as defined in claim 10 including the further step of (F) applying an azo dye to the cured coating of step (E) to provide a tinted, scratch resistant coating on the substrate.

12. A method of producing a cured, tinted, scratch resistant coating on a transparent substrate, the method comprising the steps of:
(A) hydrolyzing methacryloxypropyltrimethoxy silane with about 1 to 7 moles of water and phenyphosphonic acid to provide a solvent soluble, further curable organopolysiloxane;
(B) dissolving the organopolysiloxane of step (A) in an organic solvent;
(C) adding phenylphosphonic acid to the solution of (B) and dissolving the same;
(D) coating a transparent substrate with the solution of (C);
(E) heating the coating to cure the organopolysiloxane and provide a tintable, cured, scratch resistant coating; and
(F) applying an azo dye to the cured coating of step (E) to provide a tinted, scratch resistant coating on the substrate.

13. A method of producing a cured, tinted scratch resistant coating on a transparent substrate, the method comprising the steps of:
(A) hydrolyzing vinyl triethoxy silane with about 1 to 7 moles of water and phenylphosphonic acid to provide a solvent soluble, further curable organopolysiloxane;
(B) dissolving the organopolysiloxane of step (A) in an organic solvent;
(C) adding phenylphosphonic acid to the solution of (B) and dissolving the same;
(D) coating a transparent substrate with the solution of (C);
(E) heating the coating to cure the organopolysiloxane and provide a tintable, cured, scratch resistant coating; and
(F) applying an azo dye to the cured coating of step (E) to provide a tinted, scratch resistant coating on the substrate.

14. A composition for providing a scratch resistant, tintable cured coating for a transparent substrate, the composition comprising
(A) a further curable, solvent soluble organopolysiloxane that is a hydrolysis reaction product of vinyl triethoxy silane and water;
(B) phenylphosphonic acid as an additive to part (A) before coating the substrate or used in the hydrolysis as a starting ingredient; and
(C) an organic solvent for (A) and (B), the solution being adapted for coating and curing to form a scratch resistant azo dye tintable cured coating.

15. A cured, tinted, scratch resistant coating on a transparent substrate, the coating made as defined in claim 12.

16. A cured tinted scratch resistant coating made as defined in claim 13.

17. A tintable, scratch resistant coating on a substrate, the coating made as defined in claim 10.

18. A cured, tinted, scratch resistant coating for a polycarbonate substrate, the coating made by hydrolyzing methacryloxypropyltrimethoxy silane and vinyl triethoxy silane with about 2 to 3 moles of water per mole of silane with phenylphosphonic acid to provide a solvent soluble, further curable organopolysiloxane, the organopolysiloxane being dissolved in an organic solvent along with additional phenylphosphonic acid to form a coating solution that is applied to the polycarbonate surface and the resultant coating cured, an azo dye being applied to the cured coating and thereafter heated to form a tinted, cured, scratch resistant coating.

* * * * *